(12) United States Patent  
Kuwabara et al.

(10) Patent No.: US 12,459,531 B2
(45) Date of Patent: Nov. 4, 2025

(54) ALARM DEVICE, ALARM METHOD AND NON-TRANSITORY RECORDING MEDIUM

(71) Applicant: TOYOTA JIDOSHA KABUSHIKI KAISHA, Toyota (JP)

(72) Inventors: Takahiko Kuwabara, Yokohama (JP); Toshiaki Iwasaki, Tokyo-to (JP); Masato Uehara, Tokyo-to (JP); Tomoki Miyata, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 18/384,106

(22) Filed: Oct. 26, 2023

(65) Prior Publication Data

US 2024/0227843 A1    Jul. 11, 2024

(30) Foreign Application Priority Data

Jan. 6, 2023   (JP) .................................. 2023-000966

(51) Int. Cl.
*B60W 50/16*    (2020.01)
*B60R 21/0134*  (2006.01)
(Continued)

(52) U.S. Cl.
CPC ......... *B60W 50/16* (2013.01); *B60R 21/0134* (2013.01); *B60R 21/01538* (2014.10);
(Continued)

(58) Field of Classification Search
CPC .. B60W 50/16; B60W 30/09; B60W 30/0956; B60W 40/08; B60W 2040/0827;
(Continued)

(56) References Cited

U.S. PATENT DOCUMENTS 6,256,565 B1   7/2001   Yanagi et al.
6,374,168 B1   4/2002   Fujii
(Continued)

FOREIGN PATENT DOCUMENTS

JP   H11-189066 A   7/1999
JP   2000-190815 A  7/2000
(Continued)

*Primary Examiner* — Mohamed Barakat
(74) *Attorney, Agent, or Firm* — Dinsmore & Shohl LLP

(57) ABSTRACT

An alarm device includes a unit determining whether state of driver is inappropriate state to generate vibration of predetermined intensity in seat belt based on in-vehicle sensor signal, a unit determining whether situation requiring notification of predetermined warning to the driver occurs, based on out-of-vehicle sensor signal, behavior sensor signal, in-vehicle sensor signal, and current location of vehicle, and a unit notifying driver of predetermined warning by generating vibration of predetermined intensity in seat belt when situation requiring notification of predetermined warning occurs and when state of driver is not an inappropriate one, notifying driver of predetermined warning by generating vibration of intensity weaker than predetermined intensity in seat belt or using notification unit other than seat belt or stopping notification of predetermined warning, when situation requiring notification of predetermined warning occurs and when state of driver is an inappropriate one.

8 Claims, 4 Drawing Sheets

(51) Int. Cl.
    *B60R 21/015*     (2006.01)
    *B60W 30/09*     (2012.01)
    *B60W 30/095*     (2012.01)
    *B60W 40/08*     (2012.01)
    *G06V 20/59*     (2022.01)
    *B60R 21/01*     (2006.01)
    *B60W 50/14*     (2020.01)

(52) U.S. Cl.
    CPC ........ *B60W 30/09* (2013.01); *B60W 30/0956* (2013.01); *B60W 40/08* (2013.01); *G06V 20/597* (2022.01); *B60R 2021/01272* (2013.01); *B60W 2040/0827* (2013.01); *B60W 2050/146* (2013.01); *B60W 2420/403* (2013.01); *B60W 2540/229* (2020.02)

(58) Field of Classification Search
    CPC ..... B60W 2050/146; B60W 2420/403; B60W 2540/229; B60R 2021/01272; B60R 21/0134; B60R 21/01538; G06V 20/597

See application file for complete search history.

(56) References Cited

U.S. PATENT DOCUMENTS

| | | | |
|---|---|---|---|
| 7,481,460 B2 * | 1/2009 | Odate | B60R 22/46 |
| | | | 280/806 |
| 9,102,220 B2 * | 8/2015 | Breed | G01S 17/88 |
| 12,300,107 B2 * | 5/2025 | Fujimoto | B60W 50/14 |
| 2009/0231145 A1 | 9/2009 | Wada et al. | |
| 2018/0330177 A1 * | 11/2018 | Ryu | B62D 15/021 |
| 2020/0307644 A1 * | 10/2020 | Hattori | B60W 60/0053 |
| 2021/0101604 A1 * | 4/2021 | Sato | B60R 16/037 |
| 2021/0103748 A1 * | 4/2021 | Nakamura | G06V 20/597 |
| 2022/0126691 A1 * | 4/2022 | Yu | B60W 50/16 |
| 2023/0131363 A1 * | 4/2023 | Kato | B60N 2/90 |
| | | | 701/36 |

FOREIGN PATENT DOCUMENTS

| | | |
|---|---|---|
| JP | 2001-055105 A | 2/2001 |
| JP | 2005-254920 A | 9/2005 |
| JP | 2008-024074 A | 2/2008 |
| JP | 2009-213779 A | 9/2009 |
| JP | 2014-080042 A | 5/2014 |
| JP | 2014-172554 A | 9/2014 |
| JP | 2020-082897 A | 6/2020 |
| JP | 2021-024479 A | 2/2021 |

\* cited by examiner

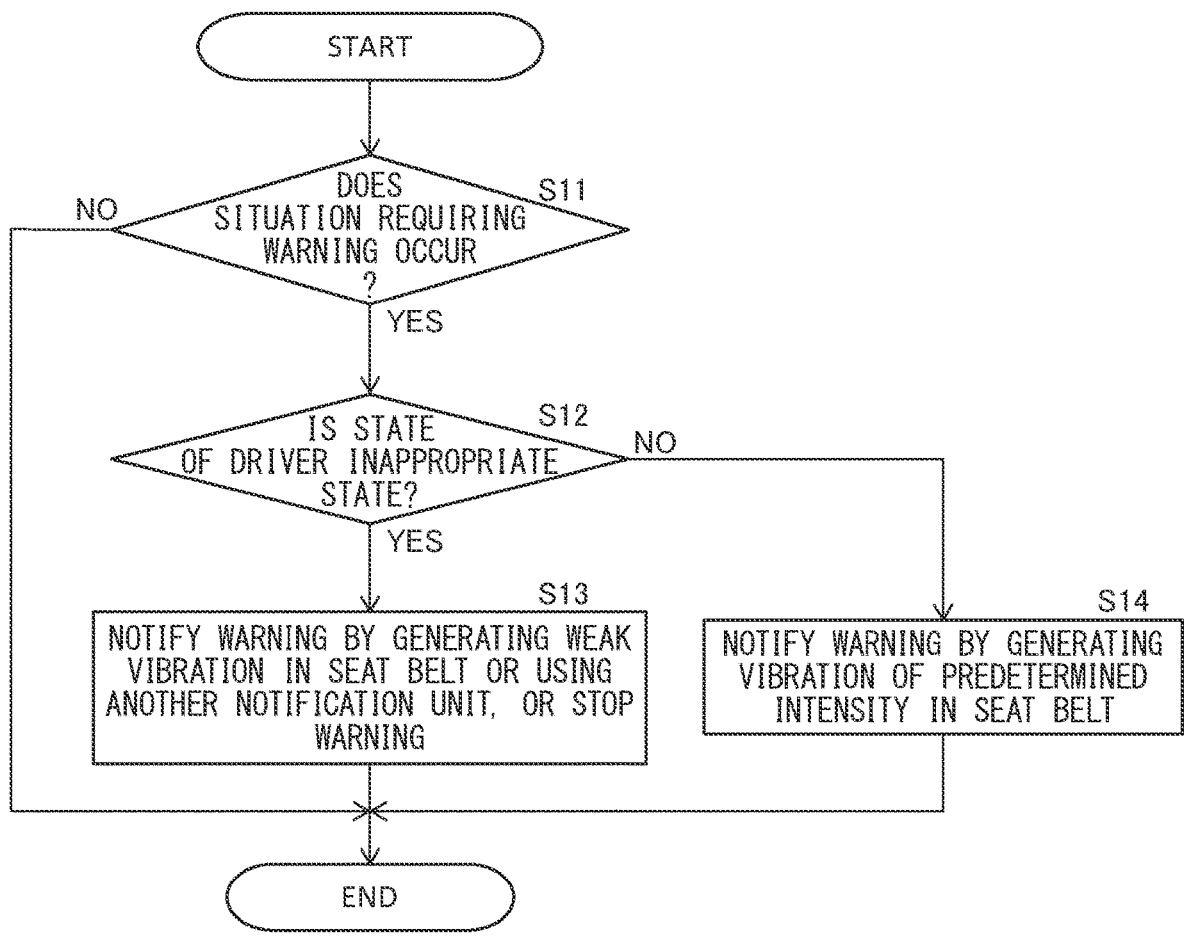

ALARM DEVICE, ALARM METHOD AND NON-TRANSITORY RECORDING MEDIUM

CROSS-REFERENCE TO RELATED APPLICATION

This application claims priority to Japanese Patent Application No. 2023-000966 filed on Jan. 6, 2023, the entire contents of which are herein incorporated by reference.

TECHNICAL FIELD

The present disclosure relates to an alarm device, an alarm method and a non-transitory recording medium.

BACKGROUND

Patent Document (JP 2001-055105 A) describes a technique in which a failure event around the vehicle and of the vehicle itself is recognized, the risk of a failure event is predicted, an alarm is given to an occupant, and the occupant is protected. In the technique described in the Patent Document, obstacles around the own vehicle are detected, and situations of the speed, acceleration, and the like of the own vehicle are detected, the danger level of the obstacles to the own vehicle and the danger level of the own vehicle alone are determined from these detection results, and the area and shape of the contact portion between the occupant and the belt of the seat belt device provided in the own vehicle are changed according to the danger level.

Depending on the state of the driver, it may be undesirable to compress the chest or abdomen of the driver by vibrating the seat belt.

SUMMARY

In view of the above-described points, it is an object of the present disclosure to provide an alarm device, an alarm method, and a non-transitory recording medium capable of reducing the possibility of imposing an excessive burden on the driver.

(1) An aspect of the present disclosure is an alarm device including a processor being configured to: determine whether a state of a driver is an inappropriate state to generate vibration of a predetermined intensity in a seat belt or to apply tension of a predetermined intensity to the seat belt, based on an in-vehicle sensor signal; determine whether a situation requiring notification of a predetermined warning to the driver occurs, based on at least one of an out-of-vehicle sensor signal, a behavior sensor signal, the in-vehicle sensor signal, and a current location of a vehicle; and notify the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one, and notify the driver of the predetermined warning by one of generating vibration of an intensity weaker than a predetermined intensity in the seat belt, applying tension of an intensity weaker than a predetermined intensity to the seat belt, and using a notification unit other than the seat belt when the situation requiring the notification of the predetermined warning occurs and when the state of the driver is an inappropriate one or stop notification of the predetermined warning when the situation requiring notification of the predetermined warning occurs and when the state of the driver is an inappropriate one.

(2) The alarm device according to above aspect (1), wherein the in-vehicle sensor signal may be a driver image, the vehicle may be provided with an input device configured to receive an input of the driver requesting that the predetermined warning is notified to the driver by one of generating the vibration of the intensity weaker than the predetermined intensity in the seat belt, applying the tension of the intensity weaker than the predetermined intensity to the seat belt, and using the notification unit other than the seat belt or that the notification of the predetermined warning is stopped, when the situation requiring the notification of the predetermined warning occurs and when the state determination unit determines that the state of the driver may be an inappropriate one, based on the driver image, the processor may be configured to execute processing according to a request of the driver when the situation requiring the notification of the predetermined warning occurs, when the state of the driver may be an inappropriate one, and when the input device receives the request of the driver.

(3) The alarm device according to above aspect (1) or (2), wherein the processor may be configured to notify the driver of the predetermined warning by vibrating a seat of the driver or vibrating a steering that the driver is touching when the situation requiring the notification of the predetermined warning occurs and when the state of the driver is an inappropriate one.

(4) The alarm device according to any one of above aspects (1) to (3), wherein the processor may be configured to determine that the situation requiring the notification of the predetermined warning to the driver occurs when it is necessary to request the driver to change the operation from automated operation to manual operation, when the vehicle approaches a front vehicle, or when the state of the driver is in a drowsiness state or an inattentive driving state.

(5) The alarm device according to any one of above aspects (1) to (4), wherein the processor may be configured to determine that the situation requiring the notification of the predetermined warning to the driver occurs when the driver is not aware of a warning display even though a display device provided in the vehicle is performing the warning display to the driver.

(6) The alarm device according to any one of above aspects (1) to (5), wherein the processor may be configured to vibrate a seat of a passenger when the warning control unit stops the notification of the predetermined warning to the driver or when the driver does not notice the notification of the predetermined warning to the driver.

(7) The alarm device according to any one of above aspects (1) to (6), wherein the processor may be configured to notify the driver of the predetermined warning by generating the vibration of the predetermined intensity in the seat belt when the vehicle approaches a front vehicle and when the state of the driver is not an inappropriate one and when a collision between the vehicle and the front vehicle can be avoided, and execute control to fix the driver to the seat of the driver by applying the tension of the predetermined intensity to the seat belt when the vehicle approaches the front vehicle and when the state of the driver is not an inappropriate one and when the collision between the vehicle and the front vehicle cannot be avoided.

(8) An aspect of the present disclosure is an alarm method including: determining whether a state of a driver is an inappropriate state to generate vibration of a predetermined intensity in a seat belt or to apply tension of a predetermined intensity to the seat belt, based on an in-vehicle sensor signal; determining whether a situation requiring notification of a predetermined warning to the driver occurs, based on at least one of an out-of-vehicle sensor signal, a behavior sensor signal, the in-vehicle sensor signal, and a current location of a vehicle; notifying the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one; and notifying the driver of the predetermined warning by one of generating the vibration of an intensity weaker than the predetermined intensity in the seat belt, applying the tension of an intensity weaker than the predetermined intensity to the seat belt, and using a notification unit other than the seat belt when the situation requiring the notification of the predetermined warning occurs and when the state of the driver is an inappropriate one, or stopping the notification of the predetermined warning when the situation requiring the notification of the predetermined warning occurs and when the state of the driver is an inappropriate one.

(9) An aspect of the present disclosure is a non-transitory recording medium having recorded thereon a computer program for causing a processor to execute a process including: determining whether a state of a driver is an inappropriate state to generate vibration of a predetermined intensity in a seat belt or to apply tension of a predetermined intensity to the seat belt, based on an in-vehicle sensor signal; determining whether a situation requiring notification of a predetermined warning to the driver occurs, based on at least one of an out-of-vehicle sensor signal, a behavior sensor signal, the in-vehicle sensor signal, and a current location of a vehicle; notifying the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one; and notifying the driver of the predetermined warning by one of generating the vibration of an intensity weaker than the predetermined intensity in the seat belt, applying the tension of an intensity weaker than the predetermined intensity to the seat belt, and using a notification unit other than the seat belt when the situation requiring the notification of the predetermined warning occurs and when the state of the driver is an inappropriate one, or stopping the notification of the predetermined warning when the situation requiring the notification of the predetermined warning occurs and when the state of the driver is an inappropriate one.

According to the present disclosure, it is possible to reduce the possibility of imposing an excessive burden on the driver.

BRIEF DESCRIPTION OF THE DRAWINGS

FIG. 4 is a flowchart for explaining an example of a process of notifying a predetermined warning to the driver 40 of the vehicle 10 executed by a processor 23.

DESCRIPTION OF EMBODIMENTS

Embodiments of an alarm device, an alarm method, and a non-transitory recording medium of the present disclosure will be described below with reference to the drawings.

First Embodiment

Figure 1:
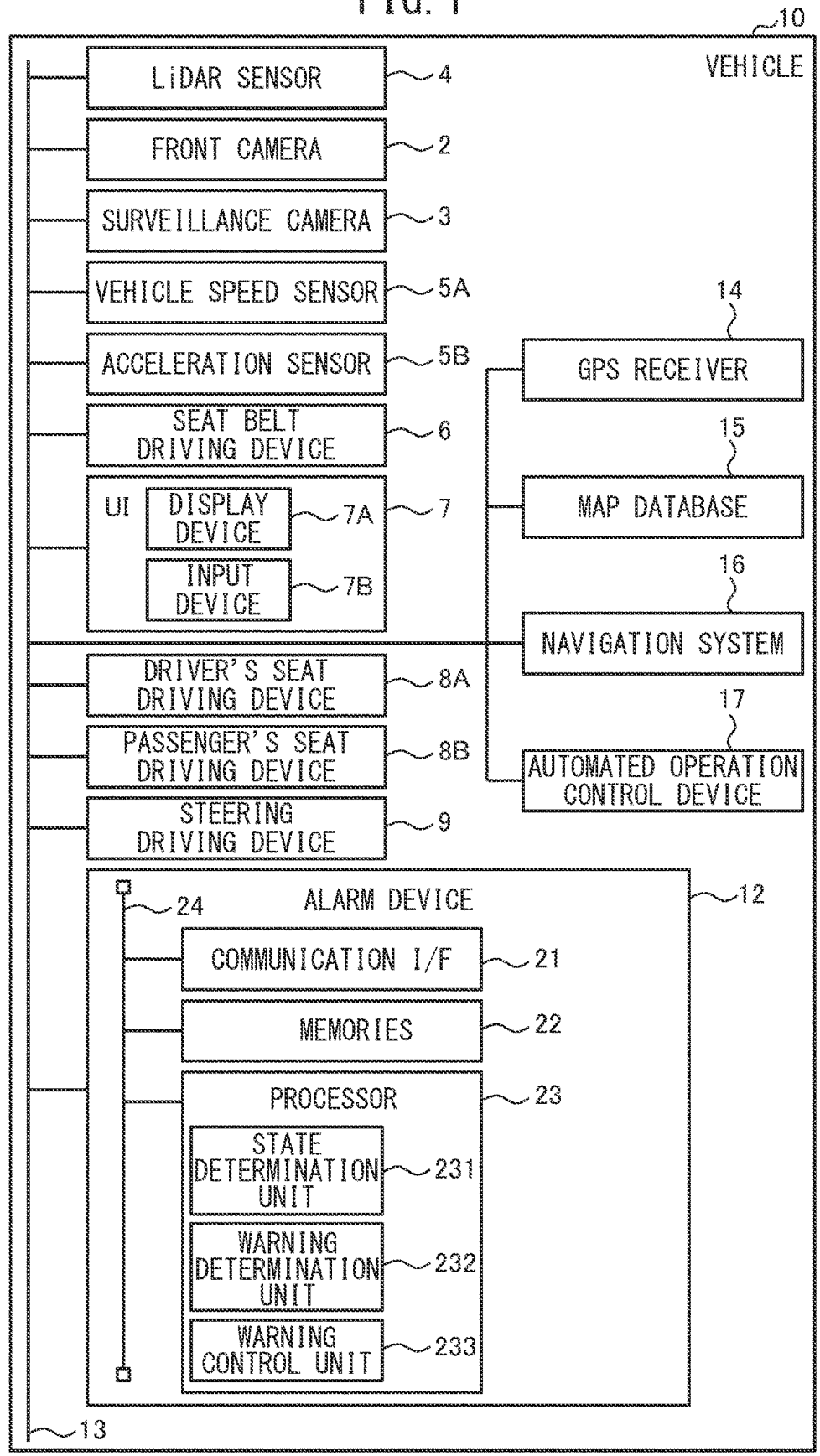
FIG. 1 is a diagram illustrating an example of a schematic configuration of a vehicle 10 to which an alarm device 12 of the first embodiment is applied.
Figure 2:
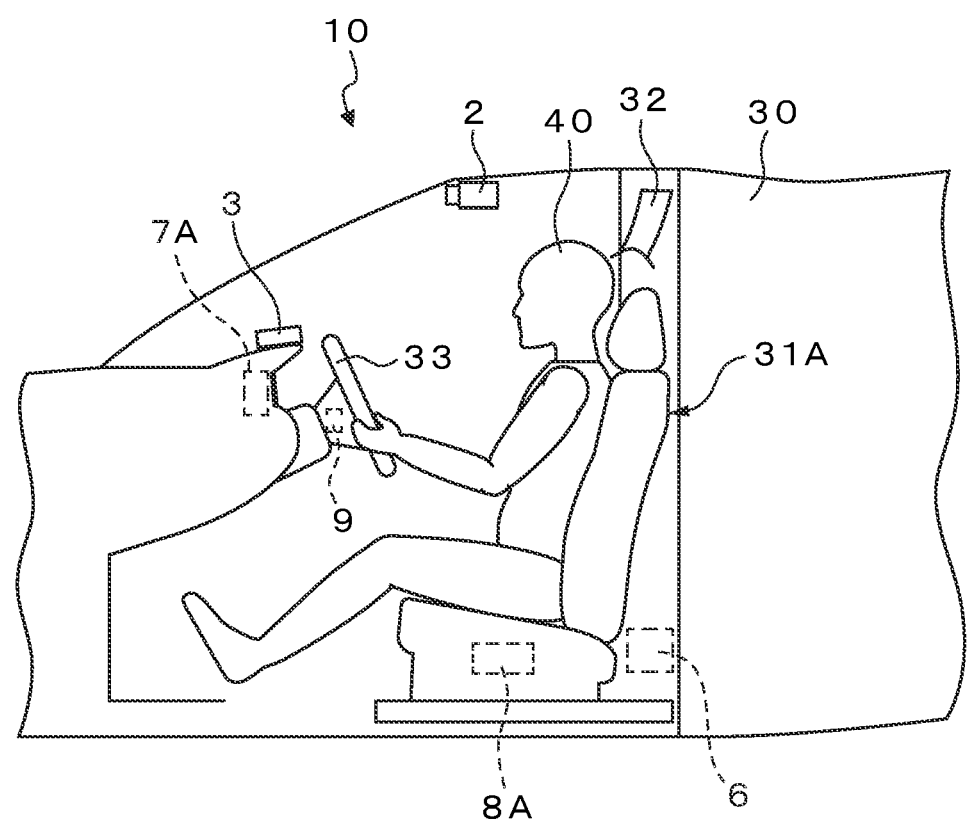
FIG. 2 is a diagram for explaining an example of a relation between a display device 7A, a driver's seat 31A, a seat belt 32, and a steering 33 provided in the vehicle 10 and a driver 40.
Figure 3:
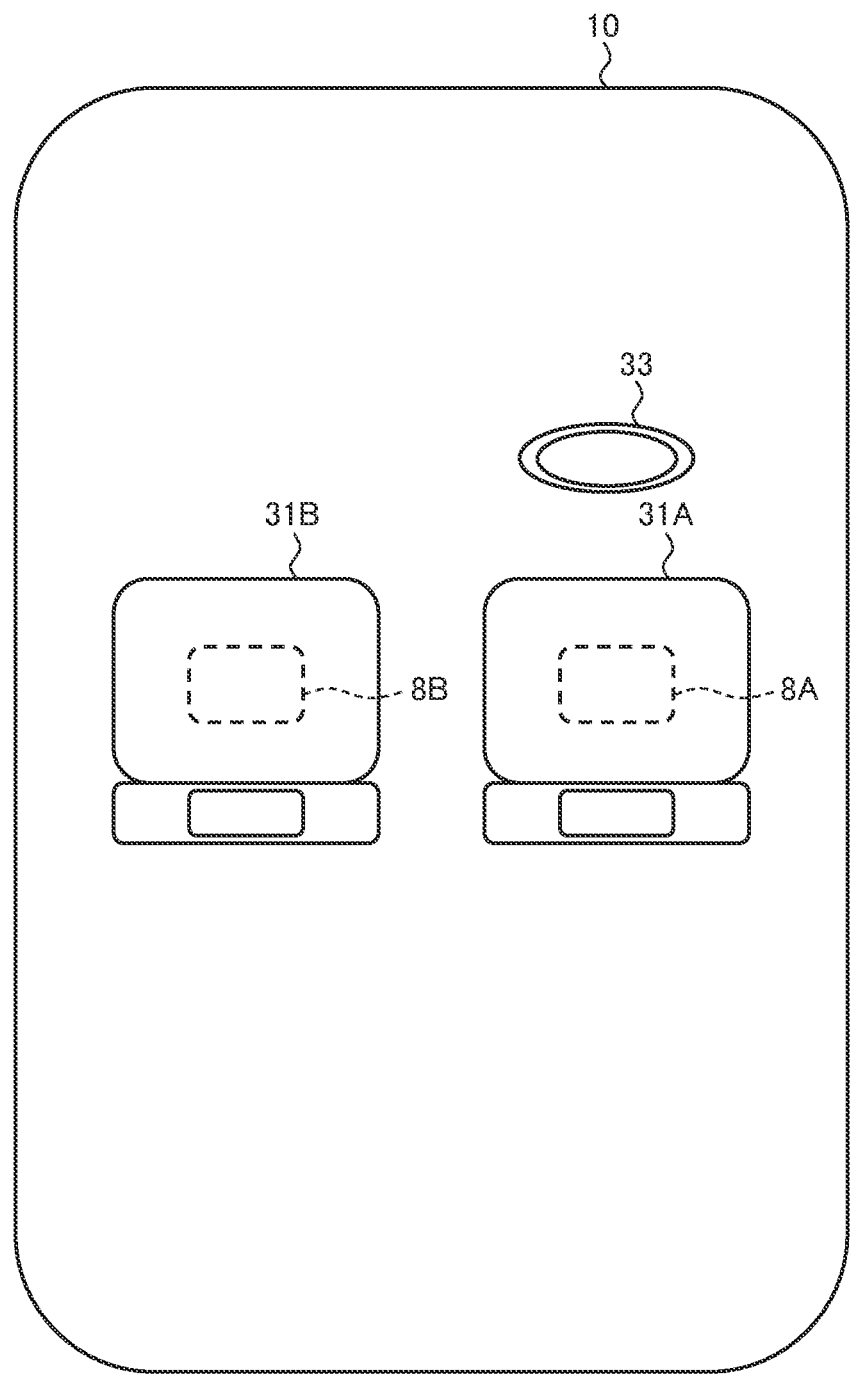
FIG. 3 is a diagram for explaining an example of a relation between the steering 33, the driver's seat 31A and a passenger's seat 31B provided in the vehicle 10.

FIG. 1 is a diagram showing an example of a schematic configuration of a vehicle 10 to which an alarm device 12 of the first embodiment is applied. FIG. 2 is a diagram for explaining an example of a relation between a display device 7A, a driver's seat 31A, a seat belt 32, and a steering 33 provided in the vehicle 10 and a driver 40. FIG. 3 is a diagram for explaining an example of a relation between the steering 33, the driver's seat 31A, and a passenger's seat 31B provided in the vehicle 10.

In the example shown in FIGS. 1 to 3, the vehicle 10 includes a front camera 2, a surveillance camera 3, a LiDAR (Light Detection And Ranging) sensor 4, a vehicle speed sensor 5A, and an acceleration sensor 5B. The front camera 2 captures an image of the front of the vehicle 10. The front camera 2 functions as an out-of-vehicle sensor and generates a vehicle front image data as an out-of-vehicle sensor signal. The surveillance camera 3 captures an image that includes the driver 40 in a cabin 30 of the vehicle 10. The surveillance camera 3 functions as an in-vehicle sensor and generates a driver image data as an in-vehicle sensor signal. The LiDAR sensor 4 detects an object (e.g., a forward vehicle, etc.) existing around the vehicle 10. The LiDAR sensor 4 serves as the out-of-vehicle sensor and generates the out-of-vehicle sensor signal indicating detection result of objects around the vehicle 10. The vehicle speed sensor 5A detects vehicle speed. The vehicle speed sensor 5A functions as a behavior sensor and generates a behavior sensor signal indicating the vehicle speed. The acceleration sensor 5B detects acceleration generated by acceleration/deceleration, pivot, collision, or the like of the vehicle 10. The acceleration sensor 5B functions as the behavioral sensor and generates the behavioral sensor signal indicating the acceleration.

The vehicle 10 also includes a GPS (Global Positioning System) receiver 14, a map database 15, and a navigation system 16. The GPS receiver 14 measures a location information of the vehicle 10 (e.g., latitude and longitude of the vehicle 10) by receiving signals from three or more GPS satellites. The map database 15 is a database with map information. The map data base 15 is stored in, for example, a HDD (Hard Disk Drive) mounted on the vehicles 10. The map information includes, for example, the location information of the road, information of the road shape (e.g., type of curve or straight portion, curvature of the curve, etc.), the location information of the intersection and the branch point, and the like. The navigation system 16 performs guidance to the destination set by the driver 40 or the like. The navigation system 16 calculates a traveling route of the vehicle 10 based on the location information of the vehicle 10 measured by GPS receiver 14 and the map information of the map database 15 and presents it to the drivers 40.

Further, the vehicle 10 includes an automated operation control device 17. The automated operation control device 17 is constituted by an automated operation control ECU (Electronic Control Unit). The automated operation control ECU is constituted by a microcomputer including a communication interface (I/F) (not shown), memories (not shown), a processor (not shown), and the like.

The automated operation control device 17 can control the vehicle 10 at a level 3 which is an operation control level defined by SAE (Society of Automotive Engineers), i.e., an operation control level in which an operation of an accelerator (not shown), a braking (not shown) and the steering 33 and monitoring around vehicle 10 by the driver 40 are not required. Further, the automated operation control device 17 can control the vehicle 10 at the operation control level at which the drivers 40 are involved in driving the vehicle 10, e.g., levels 0 to 2 which are operation control levels as defined by SAE.

The vehicle 10 also includes a seat belt driving device 6, a user interface (UI) 7, a driver's seat driving device 8A, a passenger's seat driving device 8B, a steering driving device 9, and the alarm device 12. The front camera 2, the surveillance camera 3, the LiDAR sensor 4, the vehicle speed sensor 5A, the acceleration sensor 5B, the seat belt driving device 6, the user interface 7, the driver's seat driving device 8A, the passenger's seat driving device 8B, the steering driving device 9, the alarm device 12, the GPS receiver 14, the map database 15, the navigation system 16, and the automated operation control device 17 are connected via an in-vehicle network 13.

The seat belt driving device 6 is an actuator for generating vibration in the seat belt 32 (particularly in a webbing of the seat belt 32) or applying tension to the seat belt 32 (particularly to the webbing of the seat belt 32).

In an example of the vehicle 10 to which the alarm device 12 of the first embodiment is applied, the seat belt driving device 6 is the actuator that generates vibration in the seat belt 32. The seat belt driving device 6 is, for example, located at an anchor portion of the seat belt 32 and is in contact with the end of the webbing in other words, locked to an anchor plate. In addition, the seat belt driving device 6 has a function of generating the vibration in the seat belt 32 in response to a control signal from the alarm device 12.

In another example of the vehicle 10 to which the alarm device 12 of the first embodiment is applied, the seat belt driving device 6 is the actuator that applies tension to the seat belt 32. The seat belt driving device 6 has a function of generating gas by igniting in response to a control signal from the alarm device 12, rotating a spool (not shown) by moving a piston rack (not shown), winding the seat belt 32, and applying the tension to the seat belt 32, for example.

In the example shown in FIGS. 1-3, the user interface 7 includes the display device 7A and an input device 7B. The display device 7A has a function of notifying a predetermined warning to the driver 40 in response to a control signal from the alarm device 12 (e.g., a function of lighting the warning lamp, a function of displaying an alarm image, a function of displaying a warning message, etc.). The input device 7B has a function of receiving input of various requirements by the drivers 40.

The driver's seat driving device 8A is an actuator that generates vibration in the driver's seat 31A. In the example shown in FIGS. 2 and 3, the driver's seat driving device 8A is disposed on a seat cushion of the driver's seat 31A. The driver's seat driving device 8A has a function of generating vibration in the seat cushion of the driver's seat 31A in response to a control signal from the alarm device 12 and transmitting the vibration to the thigh or the like of the driver 40. In another example, the driver's seat driving device 8A may be disposed in a seat back of the driver's seat 31A. In this example, the driver's seat driving device 8A has a function of generating vibration in the seat back of the driver's seat 31A in response to a control signal from the alarm device 12 and transmitting the vibration to the back, waist, etc. of the driver 40.

In the example shown in FIGS. 1-3, the passenger's seat driving device 8B is an actuator that generates vibration in the passenger's seat 31B. In the example shown in FIG. 3, the passenger's seat driving device 8B is disposed in a seat cushion of the passenger's seat 31B. The passenger's seat driving device 8B has a function of generating vibration in the seat cushion of the passenger's seat 31B in response to a control signal from the alarm device 12 and transmitting the vibration to the thigh or the like of a passenger seated on the passenger's seat 31B. In another example, the passenger's seat driving device 8B may be disposed in a seat back of the passenger's seat 31B. In this example, the passenger's seat driving device 8B has a function to generate vibration in the seat back of the passenger's seat 31B in response to a control signal from the alarm device 12 and to transmit the vibration to the back, waist, or the like of the passenger seated on the passenger's seat 31B.

In the example shown in FIGS. 1 to 3, the steering driving device 9 is an actuator that generates vibration in the steering 33. The steering driving device 9 has a function of generating vibration in the steering 33 in response to a control signal from the alarm device 12 and transmitting the vibration to the hand of the driver 40.

The alarm device 12 is constituted by an alarm ECU. The alarm device 12 (alarm ECU) includes a communication interface (I/F) 21, memories 22, and a processor 23. The communication interface 21, the memories 22 and the processor 23 of the alarm device 12 are connected via a signal line 24.

The communication interface 21 includes interface circuitry for connecting the alarm device 12 to the in-vehicle network 13.

The memories 22 are an example of a storage unit, and include, for example a volatile semiconductor memory and a non-volatile semiconductor memory. The memories 22 store programs used in the processing performed by the processor 23 and various data.

The processor 23 has a function of generating a control signal for controlling the seat belt driving device 6, the display device 7A, the driver's seat driving device 8A, the passenger's seat driving device 8B, the steering driving device 9, and the like, and causing them to notify the driver 40 of the predetermined warning based on the control signal.

As described above, in the example of the alarm device 12 of the first embodiment, the seat belt driving device 6 can notify the driver 40 of the predetermined warning by generating the vibration in the seat belt 32. Further, in another example of the alarm device 12 of the first embodiment, the seat belt driving device 6 can notify the driver 40 of the predetermined warning by applying the tension to the seat belt 32.

On the other hand, when the driver 40 is, for example, a pregnant woman, a defective physical health person, an injured person, or the like, if the predetermined warning is notified to the driver 40 by generating vibration in the seat belt 32 or by applying tension to the seat belt 32, there is a possibility that an excessive burden will be imposed on the driver 40, which is not appropriate.

In view of this, in the alarm device 12 of the first embodiment, measures to be described later are implemented.

In the example shown in FIGS. 1 to 3, the processor 23 includes a state determination unit 231, a warning determination unit 232, and a warning control unit 233.

In the example illustrated in FIGS. 1 to 3, the state determination unit 231, the warning determination unit 232, and the warning control unit 233 are included in one processor (processor 23) included in one ECU (alarm ECU), but in another example, the processor including the state determination unit 231, the processor including the warning determination unit 232, and the processor including the warning control unit 233 may be different. In other words, the processor 23 shown in FIG. 1 may be configured by a plurality of processors. In yet another example, the ECU including the state determination unit 231, the ECU including the warning determination unit 232, and the ECU including the warning control unit 233 may be different. In other words, the alarm device 12 (alarm ECU) shown in FIG. 1 may be constituted by a plurality of ECUs.

In the example shown in FIGS. 1 to 3, the state determination unit 231 determines whether or not the state of the driver 40 is an inappropriate state in which it is inappropriate to generate vibration of a predetermined intensity in the seat belt 32 or to apply tension of a predetermined intensity to the seat belt 32 based on the in-vehicle sensor signal.

For example, the state determination unit 231 determines whether or not the driver 40 is a pregnant woman, based on the image data of the driver 40 (in-vehicle sensor signal) captured by the surveillance camera 3. The state determination unit 231 determines that the state of the driver 40 is an inappropriate one when it is determined that the driver 40 is a pregnant woman.

The state determination unit 231 can use a deep neural network (DNN), i.e. learned in advance so as to detect the drivers 40 (pregnant women) represented in the in-vehicle image from, for example, the inputted in-vehicle image (image captured by the surveillance camera 3) as the discriminator. The state determination unit 231 may use, as such DNN, a DNN having a convolutional neural network (CNN) type architecture such as Single Shot MultiBox Detector (SSD) (Wei Liu et al., "SSD: Single Shot MultiBox Detector", ECCV2016, 2016), or Faster R-CNN (Shaoqing Ren et al., "Faster R-CNN: Towards Real-Time Object Detection with Region Proposal Networks", NIPS, 2015, for example.

Alternatively, the state determination unit 231 may use a discriminator other than DNN as the discriminator. For example, the state determination unit 231 may use a support vector machine (SVM), i.e. learned in advance so as to output a confidence degree showing probability that the drivers 40 (pregnant women) as detection targets are included in the window, based on an input of a feature quantity (for example, Histograms of Oriented Gradients, HOG), i.e. calculated from the window set on an in-vehicle image, as the discriminator. The state determination unit 231 computes the feature quantity from the window while variously changing the position, size, and aspect ratio of the window to be set on the in-vehicle image, and inputs the computed feature quantity to SVM to obtain the confidence degree for the window. When the confidence degree is equal to or more than a predetermined detection threshold value, the state determination unit 231 sets the window as an object area in which the driver 40 (pregnant woman) as the detection target is included.

The state determination unit 231 determines whether or not the driver 40 is a defective physical health person based on the image data of the driver 40 (in-vehicle sensor signal) captured by the surveillance camera 3. The state determination unit 231 determines that the state of the driver 40 is an inappropriate one when it is determined that the driver 40 is a person with defective physical health.

Furthermore, the state determination unit 231 determines whether or not the driver 40 is an injured person based on the image data of the driver 40 (in-vehicle sensor signal) captured by the surveillance camera 3. When the state determination unit 231 determines that the driver 40 is an injured person, it determines that the state of the driver 40 is an inappropriate one.

In another example, the state determination unit 231 may determine that the state of the driver 40 is an inappropriate one when it is determined that the driver 40 is a person other than a pregnant woman, a person with defective physical health, or an injured person.

In the example shown in FIGS. 1 to 3, the warning determination unit 232 has a function of determining whether or not a situation requiring notification of the predetermined warning to the driver 40 occurs based on the out-of-vehicle sensor signal.

For example, the warning determination unit 232 has a function of determining that the situation requiring notification of the predetermined warning to the driver 40 occurs based on the image data of the front of the vehicle 10 (out-of-vehicle sensor signal) captured by the front camera 2 when the vehicle 10 approaches the front vehicle. Further, for example, the warning determination unit 232 has a function of determining that the situation requiring notification of the predetermined warning to the driver 40 occurs based on the detection result of the LiDAR sensor 4 (out-of-vehicle sensor signal) when the vehicle 10 approaches the front vehicle.

Further, the warning determination unit 232 has a function of determining whether it is necessary to request the driver 40 to change the operation from automated operation to manual operation based on the current location of the vehicle 10. Specifically, the warning determination unit 232 has a function of determining whether it is necessary to request the driver 40 to change the operation from automated operation to manual operation based on the location information of the vehicle 10 measured by GPS receiver 14 and the map information of the map database 15. The warning determination unit 232 determines that the situation requiring notification of the predetermined warning to the driver 40 occurs when it is necessary to request the driver 40 to change the operation from automated operation to manual operation.

The warning determination unit 232 has a function of determining whether or not the situation requiring notification of the predetermined warning to the driver 40 occurs, based on the in-vehicle sensor signal.

For example, the warning determination unit 232 has a function of determining that the situation requiring notification of the predetermined warning to the driver 40 occurs based on the image data of the driver 40 (in-vehicle sensor signal) captured by the surveillance camera 3 when the state of the driver 40 is in a state of drowsiness. Further, for example, the warning determination unit 232 has a function of determining that the situation requiring notification of the predetermined warning to the driver 40 occurs, based on the image data of the driver 40 (in-vehicle sensor signal) captured by the surveillance camera 3 when the driver 40 is in an inattentive driving state. Furthermore, for example, the warning determination unit 232 determines that the situation requiring notification of the predetermined warning to the driver 40 occurs, based on the image data of the driver 40 (in-vehicle sensor signal) captured by the surveillance camera 3, when the driver 40 is not aware of the warning display, even though the display device 7A is performing the warning display to the driver 40.

In another example, the warning determination unit 232 may have a function to determine that the situation requiring notification of the predetermined warning to the driver 40 occurs based on a signal indicating the open state of the door (in-vehicle sensor signal) detected by a door sensor (not shown) when the door of the vehicle 10 is in the open state. In addition, the warning determination unit 232 may have a function to determine that the situation requiring notification of the predetermined warning to the driver 40 occurs based on a signal indicating a malfunction or failure of the vehicle 10 (in-vehicle sensor signal) detected by a vehicle sensor (not shown) when the vehicle 10 is malfunctioning or failing.

In the example shown in FIGS. 1 to 3, the warning determination unit 232 has a function to determine whether or not the situation requiring notification of the predetermined warning to the driver 40 occurs based on the behavior sensor signal (a detection signal of the vehicle speed sensor 5A and a detection signal of the acceleration sensor 5B).

For example, the warning determination unit 232 has a function to determine that the situation requiring notification of the predetermined warning to the driver 40 occurs on the basis of the detection signal of the vehicle speed sensor 5A or the detection signal of the acceleration sensor 5B when a defect such as a malfunction occurs in the vehicle 10.

In the example shown in FIGS. 1 to 3, the warning determination unit 232 has a function to determine whether the situation requiring notification of the predetermined warning to the driver 40 occurs on the basis of the out-of-vehicle sensor signal, a function to determine whether the situation requiring notification of the predetermined warning to the driver 40 occurs on the basis of the current location of the vehicle 10, a function to determine whether the situation requiring notification of the predetermined warning to the driver 40 occurs on the basis of the in-vehicle sensor signal, and a function to determine whether the situation requiring notification of the predetermined warning to the driver 40 occurs on the basis of the behavior sensor signal, but in another example, the warning determination unit 232 may not have all of the function to determine whether the situation requiring notification of the predetermined warning to the driver 40 occurs on the basis of the out-of-vehicle sensor signal, the function to determine whether the situation requiring notification of the predetermined warning to the driver 40 occurs on the basis of the current location of the vehicle 10, the function to determine whether the situation requiring notification of the predetermined warning to the driver 40 occurs on the basis of the in-vehicle sensor signal, and the function to determine whether the situation requiring notification of the predetermined warning to the driver 40 occurs on the basis of the behavior sensor signal. In other words, in this example, the warning determination unit 232 has a function to determine whether or not the situation requiring notification of the predetermined warning to the driver 40 occurs based on at least one (in detail, one or more and three or less) of the out-of-vehicle sensor signal, the current location of the vehicle 10, the in-vehicle sensor signal, and the behavior sensor signal.

In the example shown in FIGS. 1 to 3 (the example of the vehicle 10 to which the alarming device 12 of the first embodiment is applied), the warning control unit 233 notifies the driver 40 of the predetermined warning by generating the vibration of the predetermined intensity in the seat belt 32 when the state determination unit 231 determines that the state of the driver 40 is not an inappropriate one and when the warning determination unit 232 determines that the situation requiring the notification of the predetermined warning to the driver 40 occurs. In other words, the warning control unit 233 outputs a control signal for generating the vibration of the predetermined intensity in the seat belt 32 to the seat belt driving device 6.

On the other hand, in the first example of the alarm device 12 of the first embodiment, the warning control unit 233 notifies the driver 40 of the predetermined warning by generating the vibration of an intensity weaker than the predetermined intensity in the seat belt 32 instead of generating the vibration of the predetermined intensity in the seat belt 32, when the state determination unit 231 determines that the state of the driver 40 is an inappropriate one, and when the warning determination unit 232 determines that the situation requiring the notification of the predetermined warning to the driver 40 occurs. In other words, the warning control unit 233 outputs a control signal for generating the vibration of the intensity weaker than the predetermined intensity in the seat belt 32 to the seat belt driving device 6.

Therefore, it is possible to reduce the possibility of an excessive burden (i.e. vibration of the predetermined intensity in the seat belt 32) being imposed on the driver 40, such as a pregnant woman, a handicapped person, an injured person, or the like.

The warning control unit 233 may weaken the vibration generated in the seat belt 32 by increasing the period of the vibration generated in the seat belt 32 (In other words, the average value of the vibration intensity of the seat belt 32 may be reduced).

In the second example of the alarm device 12 of the first embodiment, the warning control unit 233 notifies the driver 40 of the predetermined warning by causing the display device 7A to perform the warning display to the driver 40 instead of generating the vibration of the predetermined intensity in the seat belt 32, when the state determination unit 231 determines that the state of the driver 40 is an inappropriate one and when the warning determination unit 232 determines that the situation requiring the notification of the predetermined warning to the driver 40 occurs. In other words, the warning control unit 233 outputs a control signal for causing the display device 7A to perform the warning display to the display device 7A.

In this example, the display device 7A functions as a notification unit other than the seat belt 32, and also in this example, it is possible to reduce the possibility of an excessive burden (the vibration of the predetermined intensity in the seat belt 32) being imposed on the drivers 40 such as a pregnant woman, a defective physical health person, an injured, or the like.

In the third example of the alarming device 12 of the first embodiment, the warning control unit 233 notifies the driver 40 of the predetermined warning by causing the driver's seat driving device 8A to generate the vibration in the driver's seat 31A instead of generating the vibration of the predetermined intensity in the seat belt 32, when the state determination unit 231 determines that the state of the driver 40 is an inappropriate one and when the warning determination unit 232 determines that the situation requiring the notification of the predetermined warning to the driver 40 occurs. In other words, the warning control unit 233 outputs a control signal for vibrating the driver's seat 31A to the driver's seat driving device 8A.

In this example, the driver's seat 31A functions as the notification unit other than the seat belt 32, and also in this example, it is possible to reduce the possibility of an excessive burden (the vibration of the predetermined intensity in the seat belt 32) being imposed on the driver 40 such as a pregnant woman, a person with defective physical health, an injured person, or the like.

In the fourth example of the alarm device 12 of the first embodiment, the warning control unit 233 notifies the driver 40 of the predetermined warning by causing the steering driving device 9 to vibrate the steering 33 instead of generating the vibration of the predetermined intensity in the seat belt 32, when the state determination unit 231 determines that the state of the driver 40 is an inappropriate one, when the warning determination unit 232 determines that the situation requiring the notification of the predetermined warning to the driver 40 occurs, and when, for example, the warning determination unit 232 determines that the driver 40 is touching the steering 33 on the basis of a driver image, a detection result of a steering touch sensor (not shown), or the like. In other words, the warning control unit 233 outputs a control signal for vibrating the steering 33 to the steering driving device 9.

In this example, the steering 33 functions as the notification unit other than the seat belt 32, and also in this example, it is possible to reduce the possibility of an excessive burden (the vibration of the predetermined intensity in the seat belt 32) being imposed on the driver 40 such as a pregnant woman, a defective physical health person, an injured, or the like.

In another example, the warning control unit 233 may notify the driver 40 of the predetermined warning by generating a warning sound such as a buzzer, or by generating the warning sound such as the buzzer and causing the display device 7A to perform the warning display, or by generating the warning sound such as the buzzer and vibrating the steering 33 or the like, instead of generating the vibration of the predetermined intensity in the seat belt 32, when the state determination unit 231 determines that the state of the driver 40 is an inappropriate one, and when the warning determination unit 232 determines that the situation requiring the notification of the predetermined warning to the driver 40 occurs.

In the fifth example of the alarm device 12 of the first embodiment, the warning control unit 233 stops the notification of the predetermined warning to the driver 40 instead of generating the vibration of the predetermined intensity in the seat belt 32, when the state determination unit 231 determines that the state of the driver 40 is an inappropriate one, and when the warning determination unit 232 determines that the situation requiring the notification of the predetermined warning to the driver 40 occurs.

Also in this example, it is possible to reduce the possibility of an excessive burden (the vibration of the predetermined intensity in the seat belt 32) being imposed on the driver 40 such as a pregnant woman, a defective physical health person, an injured, or the like.

In the fifth example of the alarm device 12 of the first embodiment, the warning control unit 233 may notify the passenger of the predetermined warning by causing the passenger's seat driving device 8B to vibrate the passenger's seat 31B when the notification of the predetermined warning to the driver 40 is stopped. In other words, in this example, the warning control unit 233 outputs a control signal for vibrating the passenger's seat 31B to the passenger's seat driving device 8B.

Also in this example, it is possible to reduce the possibility of an excessive burden (the vibration of the predetermined intensity in the seat belt 32) being imposed on the driver 40 such as a pregnant woman, a defective physical health person, an injured, or the like.

In another example, the warning control unit 233 may notify the passenger (fellow passenger) of the predetermined warning by causing the passenger's seat driving device 8B to vibrate the passenger's seat 31B when the driver 40 does not notice the predetermined warning to the driver 40, even though the warning control unit 233 notifies the driver 40 of the predetermined warning by generating the vibration of the predetermined intensity in the seat belt 32, when the state determination unit 231 determines that the state of the driver 40 is not an inappropriate one, and when the warning determination unit 232 determines that the situation requiring the notification of the predetermined warning to the driver 40 occurs.

As described above, in the example (the example of the vehicle 10 to which the alarm device 12 of the first embodiment is applied) shown in FIGS. 1 to 3, the warning control unit 233 notifies the driver 40 of the predetermined warning by generating the vibration of the predetermined intensity in the seat belt 32 when the state determination unit 231 determines that the state of the driver 40 is not an inappropriate one, and when the warning determination unit 232 determines that the situation requiring the notification of the predetermined warning to the driver 40 occurs. In another example of the vehicle 10 to which the alarm device 12 of the first embodiment is applied, the warning control unit 233 notifies the driver 40 of the predetermined warning by applying the tension of a predetermined intensity to the seat belt 32 when the state determination unit 231 determines that the state of the driver 40 is not an inappropriate one, and when the warning determination unit 232 determines that the situation requiring the notification of the predetermined warning to the driver 40 occurs. In other words, in this example, the warning control unit 233 outputs a control signal for applying the tension of the predetermined intensity to the seat belt 32 to the seat belt driving device 6.

In the sixth example of the alarm device 12 of the first embodiment, the warning control unit 233 notifies the driver 40 of the predetermined warning by applying the tension of an intensity weaker than the predetermined intensity to the seat belt 32 instead of applying the tension of the predetermined intensity to the seat belt 32, when the state determination unit 231 determines that the state of the driver 40 is an inappropriate one, and when the warning determination unit 232 determines that the situation requiring the notification of the predetermined warning to the driver 40 occurs. In other words, the warning control unit 233 outputs a control signal for applying the tension of the intensity weaker than the tension of the predetermined intensity to the seat belt 32 to the seat belt driving device 6.

In the seventh example of the alarm device 12 of the first embodiment, the warning control unit 233 notifies the driver 40 of the predetermined warning by causing the display device 7A to perform the warning display instead of applying the tension of the predetermined intensity to the seat belt 32, when the state determination unit 231 determines that the state of the driver 40 is an inappropriate one, and when the warning determination unit 232 determines that the situation requiring the notification of the predetermined warning to the driver 40 occurs.

In the eighth example of the alarm device 12 of the first embodiment, the warning control unit 233 notifies the driver 40 of the predetermined warning by causing the driver's seat driving device 8A to generate the vibration in the driver's seat 31A instead of applying the tension of the predetermined intensity to the seat belt 32, when the state determination unit 231 determines that the state of the driver 40 is an inappropriate one, and when the warning determination unit 232 determines that the situation requiring the notification of the predetermined warning to the driver 40 occurs.

In the ninth example of the alarm device 12 of the first embodiment, the warning control unit 233 notifies the driver 40 of the predetermined warning by causing the steering driving device 9 to vibrate the steering 33 instead of applying the tension of the predetermined intensity to the seat belt 32, when the state determination unit 231 determines that the state of the driver 40 is an inappropriate one, when the warning determination unit 232 determines that the situation requiring the notification of the predetermined warning to the driver 40 occurs, and when, for example, the warning determination unit 232 determines that the driver 40 is touching the steering 33 on the basis of the driver image, the detection result of the steering touch sensor (not shown), or the like.

In the tenth example of the alarm device 12 of the first embodiment, the warning control unit 233 stops the notification of the predetermined warning to the driver 40 instead of applying the tension of the predetermined intensity to the seat belt 32, when the state determination unit 231 determines that the state of the driver 40 is an inappropriate one, and when the warning determination unit 232 determines that the situation requiring the notification of the predetermined warning to the driver 40 occurs.

In the tenth example of the alarm device 12 of the first embodiment, the warning control unit 233 may notify the passenger (fellow passenger) of the predetermined warning by causing the passenger's seat driving device 8B to vibrate the passenger's seat 31B when the notification of the predetermined warning to the driver 40 is stopped.

In another example, the warning control unit 233 may notify the passenger (fellow passenger) of the predetermined warning by causing the passenger's seat driving device 8B to vibrate the passenger's seat 31B when the driver 40 does not notice the predetermined warning to the driver 40 even though the warning control unit 233 notifies the driver 40 of the predetermined warning by applying the tension of the predetermined intensity to the seat belt 32, when the state determination unit 231 determines that the state of the driver 40 is not an inappropriate one, and when the warning determination unit 232 determines that the situation requiring the notification of the predetermined warning to the driver 40 occurs.

FIG. 4 is a flowchart illustrating an example of a process of notifying the predetermined warning to the driver 40 of the vehicle 10 executed by the processor 23.

In the example shown in FIG. 4, in step S11, the warning determination unit 232 of the processor 23 determines whether or not the situation requiring notification of the predetermined warning to the driver 40 occurs based on at least one of the out-of-vehicle sensor signal, the behavior sensor signal, the in-vehicle sensor signal, and the current location of the vehicle 10. In case of YES the process proceeds to step S12, in case of NO the process shown in FIG. 4 is ended.

In step S12, the state determination unit 231 of the processor 23 determines whether or not the state of the driver 40 is an inappropriate one in which to generate vibration of the predetermined intensity in the seat belt 32 or to apply tension of the predetermined intensity to the seat belt 32 based on the in-vehicle sensor signal. In case of YES the process proceeds to step S13, in case of NO the process proceeds to step S14.

In step S13, the warning control unit 233 of the processor 23 notifies the driver 40 of the predetermined warning by any one of generating the vibration of the intensity weaker than the predetermined intensity in the seat belt 32, applying the tension of the intensity weaker than the predetermined intensity to the seat belt 32, and using the notification unit (the display device 7A, the driver's seat driving device 8A or the steering driving device 9) other than the seat belt 32 or stops the notification of the predetermined warning to the driver 40.

In step S14, the warning control unit 233 notifies the drivers 40 of the predetermined warning by generating the vibration of the predetermined intensity in the seat belt 32 or by applying the tension of the predetermined intensity to the seat belt 32.

For example, the driver 40 may be a person who is not appropriate to apply the vibration generated in the seat belt 32 to the abdomen or chest or to compress the abdomen or chest by the tension applied to the seat belt 32, such as a pregnant woman, a person with defective physical health, an injured person, or the like.

In view of this point, in the alarm device 12 of the first embodiment as described above, the warning control unit 233 executes different control in accordance with the driver 40 so that, when the driver 40 is, for example, a pregnant woman, a person with defective physical health, an injured person, or the like, the strong vibration (vibration of the predetermined intensity) generated in the seat belt 32 is not applied to the abdomen or chest of the driver 40 or the abdomen or chest of the driver 40 is not compressed by the strong tension (tension of the predetermined intensity) applied to the seat belt 32.

In other words, in the alarm device 12 of the first embodiment, when the driver 40 is, for example, a pregnant woman, a person with defective physical health, an injured person, or the like, the warning control unit 233 does not notify the driver 40 of the warning by generating the vibration of the predetermined intensity in the seat belt 32 or does not notify the driver 40 of the warning by applying the tension of the predetermined intensity to the seat belt 32.

Therefore, in the alarm device 12 of the first embodiment, it is possible to reduce the possibility of an excessive burden being imposed on the driver 40 such as a pregnant woman, a person with defective physical health, an injured person, etc.

Second Embodiment

The vehicle 10 to which the alarm device 12 of the second embodiment is applied is configured similarly to the vehicle 10 to which the alarm device 12 of the first embodiment described above is applied, except for the points to be described later.

For example, when the pregnant woman is at the initial stage of pregnancy, it is considered that it is difficult to determine whether the driver 40 is a pregnant woman or not with high accuracy, based on the driver image data. In addition, depending on the symptom of the person with defective physical health, it is considered that it is difficult to determine whether the driver 40 is a person with defective physical health with high accuracy, based on the driver image data. It is considered that it is difficult to determine whether or not the driver 40 is an injured person with high accuracy based on the driver image data, for example, when the injured part is covered with the cloth worn by the injured person. Nevertheless, when the state determination unit 231 tries to be able to determine whether or not the state of the driver 40 is an inappropriate one with high accuracy, there is a possibility that the calculation load of the alarm device 12 including the state determination unit 231 becomes too high.

In view of the above points, in the alarm device 12 of the second embodiment, measures to be described later are implemented.

In an example of the vehicle 10 to which the alarm device 12 of the second embodiment is applied, the input device 7B receives an input (input of a request of the driver 40) of a process in which the warning control unit 233 executes instead of generating the vibration of the predetermined intensity in the seat belt 32 when the situation requiring the notification of the predetermined warning occurs and when the state determination unit 231 determines that the state of the driver 40 may be an inappropriate one, based on the driver image.

Specifically, the display device 7A displays an executable process option (for example, a first option: generating the vibration of the intensity weaker than the predetermined intensity in the seat belt 32, a second option: causing the display device 7A to perform the warning display, a third option: generating the vibration in the driver's seat 31A, a fourth option: causing the steering 33 to vibrate, a fifth option: not notifying the predetermined warning, and the like) (presents the executable process option to the driver 40) instead of generating the vibration of the predetermined intensity in the seat belt 32 when the situation requiring notification of the predetermined warning occurs.

The input device 7B accepts the input of a choice selected by the drivers 40. In other words, the input device 7B receives the input of the driver 40 which requests to notify the driver 40 of the predetermined warning by either generating the vibration of the intensity weaker than the predetermined intensity in the seat belt 32 or using the notification unit (the display device 7A, the driver's seat driving device 8A, or the steering driving device 9) other than the seat belt 32 or to stop the notification of the predetermined warning when the situation requiring notification of the predetermined warning occurs and when the state determination unit 231 determines that the state of the driver 40 may be an inappropriate one, based on the driver image.

When the situation requiring notification of the predetermined warning occurs and when the state determination unit 231 determines that the state of the driver 40 may be an inappropriate one, based on the driver image, the warning control unit 233 executes processing according to the request of the driver 40.

Therefore, even when the accuracy of image recognition by the state determination unit 231 is low, it is possible to reduce the possibility of an excessive burden (strong vibration) being imposed on the driver 40 such as a pregnant woman, a person with defective physical health, an injured person, or the like.

In another example of the vehicle 10 to which the alarm device 12 of the second embodiment is applied, when the situation requiring notification of the predetermined warning occurs and when the state determination unit 231 determines that the state of the driver 40 may be an inappropriate one, based on the driver image, the input device 7B receives the input (input of the request of the driver 40) of a process to be executed instead of a process in which the warning control unit 233 applies the tension of the predetermined intensity to the seat belt 32.

Specifically, the display device 7A displays an executable process option (for example, a first option: applying the tension of the intensity weaker than the predetermined intensity to the seat belt 32, a second option: causing the display device 7A to perform the warning display, a third option: generating the vibration in the driver's seat 31A, a fourth option: causing the steering 33 to vibrate, a fifth option: not notifying the predetermined warning, and the like) (presents the executable process option to the driver 40) instead of applying the tension of the predetermined intensity to the seat belt 32 when the situation requiring notification of the predetermined warning occurs.

The input device 7B accepts the input of a choice selected by the drivers 40. In other words, the input device 7B receives the input of the driver 40 which requests to notify the driver 40 of the predetermined warning by either applying the tension of the intensity weaker than the predetermined intensity to the seat belt 32 or using the notification unit (the display device 7A, the driver's seat driving device 8A, and the steering driving device 9) other than the seat belt 32 or to stop the notification of the predetermined warning when the situation requiring notification of the predetermined warning occurs and when the state determination unit 231 determines that the state of the driver 40 may be an inappropriate one, based on the driver image.

When the situation requiring notification of the predetermined warning occurs and when the state determination unit 231 determines that the state of the driver 40 may be an inappropriate one, based on the driver image, the warning control unit 233 executes processing according to the request of the driver 40.

Therefore, even when the accuracy of the image recognition by the state determination unit 231 is low, it is possible to reduce the possibility of an excessive burden (a strong tightening force) being imposed on the driver 40 such as a pregnant woman, a person with defective physical health, an injured person, or the like.

Third Embodiment

The vehicle 10 to which the alarm device 12 of the third embodiment is applied is configured similarly to the vehicle 10 to which the alarm device 12 of the first embodiment described above is applied except for the points to be described later.

As described above, in an example of the vehicle 10 to which the alarm device 12 of the first embodiment is applied, the warning control unit 233 notifies the driver 40 of the predetermined warning by generating the vibration of the predetermined intensity in the seat belt 32 when the state determination unit 231 determines that the state of the driver 40 is not an inappropriate one, and when the warning determination unit 232 is determines that the situation requiring the notification of the predetermined warning occurs.

In addition, as described above, in another example of the vehicle 10 to which the alarm device 12 of the first embodiment is applied, the warning control unit 233 notifies the driver 40 of the predetermined warning by applying the tension of the predetermined intensity to the seat belt 32 when the state determination unit 231 determines that the state of the driver 40 is not an inappropriate one and when the warning determination unit 232 determines that the situation requiring the notification of the predetermined warning occurs.

On the other hand, in an example of the vehicle 10 to which the alarm device 12 of the third embodiment is applied, the warning control unit 233 notifies the driver of the predetermined warning by generating the vibration of the predetermined intensity in the seat belt 32 when the warning determination unit 232 determines that the vehicle 10 approaches the front vehicle, when the state determination unit 231 determines that the state of the driver is not an inappropriate one, and when, for example, the warning determination unit 232 determines that the collision between the vehicle 10 and the front vehicle can be avoided.

Further, the warning control unit 233 executes control to fix the driver 40 to the driver's seat 31A by applying the tension of the predetermined intensity to the seat belt 32 when the warning determination unit 232 determines that the vehicle 10 approaches the front vehicle, when the state determination unit 231 determines that the state of the driver is not an inappropriate one, and when, for example, the warning determination unit 232 determines that the collision between the vehicle 10 and the front vehicle cannot be avoided.

Therefore, it is possible to reduce the possibility of an excessive burden (strong tightening force) being imposed on the driver 40 despite it being possible to avoid collision between the vehicle 10 and the front vehicle, and to improve the safety of the driver 40 at the time of collision between the vehicle 10 and the front vehicle.

Fourth Embodiment

The vehicle 10 to which the alarm device 12 of the fourth embodiment is applied is configured similarly to the vehicle 10 to which the alarm device 12 of the first embodiment described above is applied except for the points to be described later.

As described above, in the vehicle 10 to which the alarm device 12 of the first embodiment is applied, the surveillance camera 3 functions as the in-vehicle sensor and generates the driver image data as the in-vehicle sensor signal. The state determination unit 231 determines whether or not the state of the driver 40 is an inappropriate one, based on the in-vehicle sensor signal (the driver image data).

On the other hand, in an example of the vehicle 10 to which the alarm device 12 of the fourth embodiment is applied, the in-vehicle sensor signal is attribute information indicating whether the driver 40 is a pregnant woman, whether the driver 40 is a person with defective physical health, whether the driver 40 is an injured person, or the like. The attribute information is stored in a storage unit of a terminal device (for example, a smartphone, a wearable terminal, or the like) which is carried, held, attached, or the like by the driver 40. The vehicle 10 has a receiver which can communicate with the terminal device and functions as the in-vehicle sensor. The state determination unit 231 determines whether or not the state of the driver 40 is an inappropriate one, based on the attribute information (the in-vehicle sensor signal) of the driver 40 received by the receiver from the terminal device.

As described above, although the embodiments of the alarm device, the alarm method, and the non-transitory recording medium of the present disclosure have been described with reference to the drawings, the alarm device, the alarm method, and the non-transitory recording medium of the present disclosure are not limited to the embodiments described above, and appropriate changes can be made without departing from the scope of the present disclosure. The configuration of each example of the embodiment described above may be appropriately combined.

In the above-described embodiments, the processing performed in the alarm device 12 (alarm ECU) has been described as a software processing performed by executing a program stored in the memories 22. However, the processing performed in the alarm device 12 may be a processing performed by hardware. Alternatively, the process performed in the alarm device 12 may be a combined process of both software and hardware. Further, a program (a program for realizing the function of the processor 23 of the alarm device 12), i.e. stored in the memories 22 of the alarm device 12 may be provided and distributed by being recorded in a computer-readable recording medium such as, for example, a semiconductor memory, a magnetic recording medium, an optical recording medium (non-transitory recording medium), or the like.

The invention claimed is:

1. An alarm device comprising a processor being configured to:
   determine whether a state of a driver is an inappropriate state to generate vibration of a predetermined intensity in a seat belt or to apply tension of a predetermined intensity to the seat belt, based on an in-vehicle sensor signal, the in-vehicle sensor signal being a driver image;
   determine whether a situation requiring notification of a predetermined warning to the driver occurs, based on at least one of an out-of-vehicle sensor signal, a behavior sensor signal, the in-vehicle sensor signal, and a current location of a vehicle, the vehicle having a user interface configured to receive an input of the driver;
   notify the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one and notify the driver of the predetermined warning by one of generating the vibration of an intensity weaker than the predetermined intensity in the seat belt, applying the tension of an intensity weaker than the predetermined intensity to the seat belt, and using a notification unit other than the seat belt when the situation requiring the notification of the predetermined warning occurs and when the state of the driver is an inappropriate one or stop the notification of the predetermined warning when the situation requiring the notification of the predetermined warning occurs and when the state of the driver is an inappropriate one; and
   execute processing according to a request of the driver when the situation requiring the notification of the predetermined warning occurs, when the state of the driver may be an inappropriate one, and when the user interface receives the request of the driver,
   wherein the user interface is configured to receive the input of the driver requesting that the predetermined warning is notified to the driver by one of generating the vibration of the intensity weaker than the predetermined intensity in the seat belt, applying the tension of the intensity weaker than the predetermined intensity to the seat belt, and using the notification unit other than the seat belt or that the notification of the predetermined warning is stopped, when the situation requiring the notification of the predetermined warning occurs and when a state determination unit determines that the state of the driver may be an inappropriate one based on the driver image.

2. The alarm device according to claim 1, wherein the processor is configured to notify the driver of the predetermined warning by vibrating a seat of the driver or vibrating a steering that the driver is touching when the situation requiring the notification of the predetermined warning occurs and when the state of the driver is an inappropriate one.

3. The alarm device according to claim 1, wherein the processor is configured to determine that the situation requiring the notification of the predetermined warning to the driver occurs when it is necessary to request the driver to change the operation from automated operation to manual operation, when the vehicle approaches a front vehicle, or when the state of the driver is in a drowsiness state or an inattentive driving state.

4. The alarm device according to claim 1, wherein the processor is configured to determine that the situation requiring the notification of the predetermined warning to the driver occurs when the driver is not aware of a warning display even though a display device provided in the vehicle is performing the warning display to the driver.

5. The alarm device according to claim 1, wherein the processor is configured to vibrate a seat of a passenger when a warning control unit stops the notification of the predetermined warning to the driver or when the driver does not notice the notification of the predetermined warning to the driver.

6. The alarm device according to claim 1, wherein the processor is configured to notify the driver of the predetermined warning by generating the vibration of the predetermined intensity in the seat belt when the vehicle approaches a front vehicle and when the state of the driver is not an inappropriate one and when a collision between the vehicle and the front vehicle can be avoided, and execute control to fix the driver to a seat of the driver by applying the tension of the predetermined intensity to the seat belt when the vehicle approaches the front vehicle and when the state of the driver is not an inappropriate one and when the collision between the vehicle and the front vehicle cannot be avoided.

7. An alarm method comprising:
   determining whether a state of a driver is an inappropriate state to generate vibration of a predetermined intensity in a seat belt or to apply tension of a predetermined intensity to the seat belt, based on an in-vehicle sensor signal, the in-vehicle sensor signal being a driver image;
   determining whether a situation requiring notification of a predetermined warning to the driver occurs, based on at least one of an out-of-vehicle sensor signal, a behavior sensor signal, the in-vehicle sensor signal, and a current location of a vehicle, the vehicle having a user interface configured to receive an input of the driver;
   notifying the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one;
   notifying the driver of the predetermined warning by one of generating the vibration of an intensity weaker than the predetermined intensity in the seat belt, applying the tension of an intensity weaker than the predetermined intensity to the seat belt, and using a notification unit other than the seat belt when the situation requiring the notification of the predetermined warning occurs and when the state of the driver is an inappropriate one, or stopping the notification of the predetermined warning when the situation requiring the notification of the predetermined warning occurs and when the state of the driver is an inappropriate one; and
   executing processing according to a request of the driver when the situation requiring the notification of the predetermined warning occurs, when the state of the driver may be an inappropriate one, and when the user interface receives the request of the driver,
   wherein the user interface is configured to receive the input of the driver requesting that the predetermined warning is notified to the driver by one of generating the vibration of the intensity weaker than the predetermined intensity in the seat belt, applying the tension of the intensity weaker than the predetermined intensity to the seat belt, and using the notification unit other than the seat belt or that the notification of the predetermined warning is stopped, when the situation requiring the notification of the predetermined warning occurs and when a state determination unit determines that the state of the driver may be an inappropriate one based on the driver image.

8. A non-transitory recording medium having recorded thereon a computer program for causing a processor to execute a process comprising:
   determining whether a state of a driver is an inappropriate state to generate vibration of a predetermined intensity in a seat belt or to apply tension of a predetermined intensity to the seat belt, based on an in-vehicle sensor signal, the in-vehicle sensor signal being a driver image;
   determining whether a situation requiring notification of a predetermined warning to the driver occurs, based on at least one of an out-of-vehicle sensor signal, a behavior sensor signal, the in-vehicle sensor signal, and a current location of a vehicle, the vehicle having a user interface configured to receive an input of the driver;
   notifying the driver of the predetermined warning by generating the vibration of the predetermined intensity in the seat belt or by applying the tension of the predetermined intensity to the seat belt when the situation requiring the notification of the predetermined warning occurs and when the state of the driver is not an inappropriate one;
   notifying the driver of the predetermined warning by one of generating the vibration of an intensity weaker than the predetermined intensity in the seat belt, applying the tension of an intensity weaker than the predetermined intensity to the seat belt, and using a notification unit other than the seat belt when the situation requiring the notification of the predetermined warning occurs and when the state of the driver is an inappropriate one, or stopping the notification of the predetermined warning when the situation requiring the notification of the predetermined warning occurs and when the state of the driver is an inappropriate one; and
   execute processing according to a request of the driver when the situation requiring the notification of the predetermined warning occurs, when the state of the driver may be an inappropriate one, and when the user interface receives the request of the driver, wherein the user interface is configured to receive the input of the driver requesting that the predetermined warning is notified to the driver by one of generating the vibration of the intensity weaker than the predetermined intensity in the seat belt, applying the tension of the intensity weaker than the predetermined intensity to the seat belt, and using the notification unit other than the seat belt or that the notification of the predetermined warning is stopped, when the situation requiring the notification of the predetermined warning occurs and when a state determination unit determines that the state of the driver may be an inappropriate one based on the driver image.

* * * * *